Sept. 28, 1943.  E. D. NICHOLS  2,330,513
CLOSURE REMOVING TOOL
Filed June 2, 1941
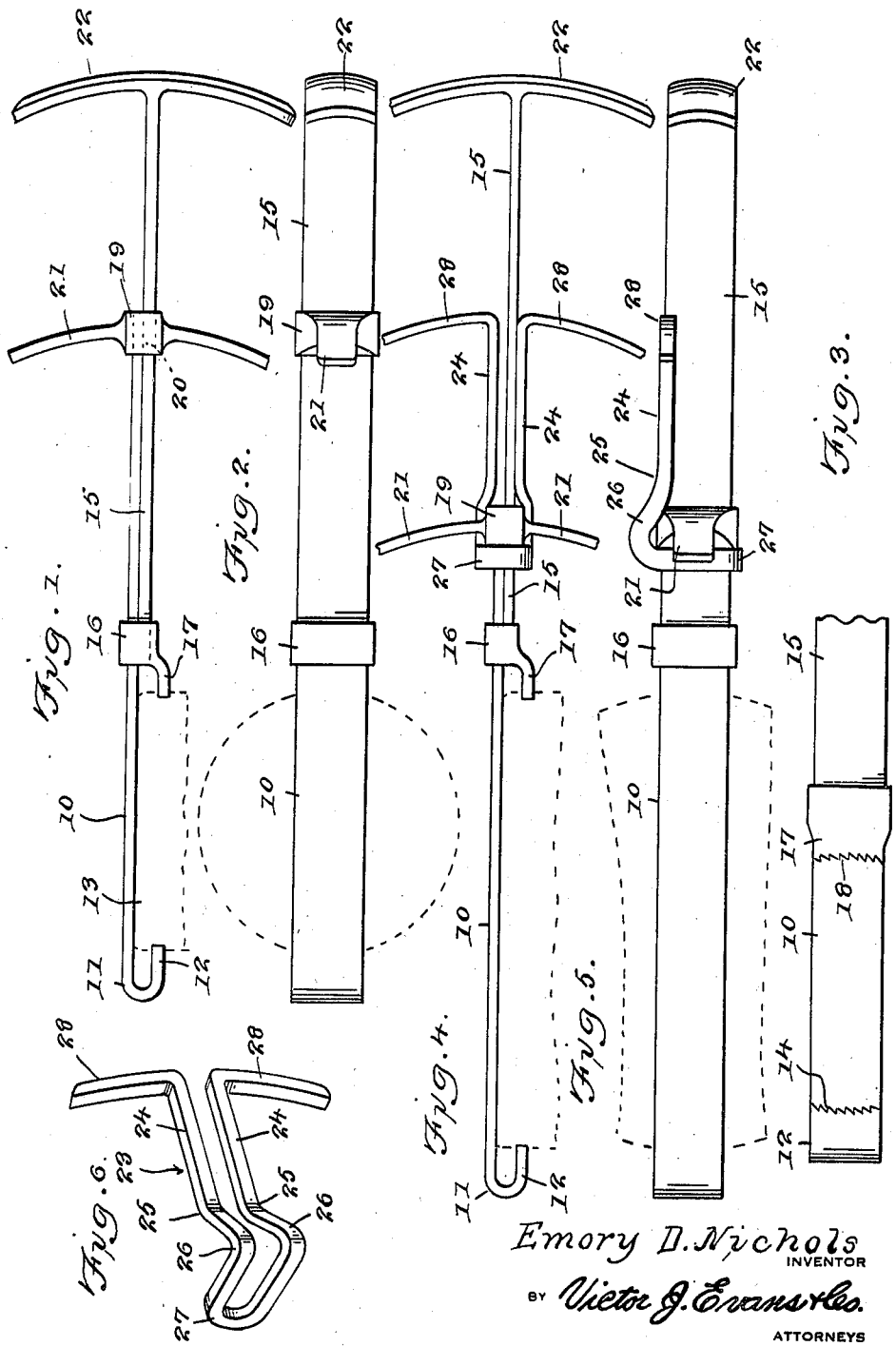
Emory D. Nichols
INVENTOR
BY Victor J. Evans & Co.
ATTORNEYS Patented Sept. 28, 1943

2,330,513

UNITED STATES PATENT OFFICE 2,330,513

CLOSURE REMOVING TOOL

Emory D. Nichols, Miami, Fla.

Application June 2, 1941, Serial No. 396,328

1 Claim. (Cl. 81—3.42)

My invention relates to the removal of closures, such as screw caps and covers, from bottles, jars and the like, and has among its objects and advantages the provision of an improved closure remover tool.

An object of my invention is to provide a closure remover tool wherein opposed toothed jaws are arranged to secure a grip on the closure to be removed, and in which the jaws are manually clamped upon the closure and manually retained in clamped engagement therewith during the removal of the closure, so that the degree of necessary clamping engagement between the jaws and the closure may readily be determined by the user in accordance with variable conditions of service to which the remover may be put, thereby eliminating breakage of containers as well as the necessity of attempting to precisely prefit the jaws upon the closure as well as the necessity of subsequently adjusting the jaws to the closure from time to time during removal thereof.

In the accompanying drawing:

Figure 1 is an edge or side view of a tool in accordance with the invention, with the tool applied to a closure;

Figure 2 is a top plan view of the structure of Figure 1;

Figure 3 is a bottom plan view of the jaw structure of the tool;

Figure 4 is a view illustrating the tool applied to a closure of relatively large diameter, together with an extension grip for use under such conditions of service;

Figure 5 is a top plan view of the structure of Figure 4; and

Figure 6 is a perspective view of the extension grip detached from the tool.

In the embodiment selected to illustrate my invention, a bar 10 is bent back upon itself at 11 to provide a jaw 12 for engagement with the peripheral face of the closure 13. This jaw parallels the bar 10 but is spaced a slight distance therefrom so that the jaw is assured peripheral engagement with the closure 13 when the bar 10 is rested on the closure. Fig. 3 illustrates the jaw 12 as being provided with closure engaging teeth 14 which are inclined in the same direction but arranged in a slightly curved line.

A second bar 15 is provided with a loop 16 at one end thereof which slidably encircles the bar 10 and is provided with a jaw 17 lying in a plane common to the jaw 12, in addition to being provided with closure engaging teeth 18 of the same arrangement and inclination as the teeth 14, but inclined in the opposite direction when viewed according to Fig. 3. For cap removing purposes, the tool is rotated in a clockwise direction, when viewed according to Fig. 3, so that the inclination of the teeth 14 and 18 is such as to cause the teeth to secure a firm grip upon the peripheral face of the closure.

Loop 16 may be welded to the bar 15 and slidably supports the two bars in face to face engagement. A head 19 is welded to the end of the bar 10 opposite its jaw 12 and is provided with an opening 20 having a snug fit on the bar 15, but the latter remains slidable freely relatively to the head 19. Grip elements 21 are carried by the head 19. Finger grips 22 are provided on the bar 15, which finger grips lie in a plane common with the finger grips 21.

In operation the finger grips 22, which are in the nature of a single curved member, are placed in the palm of the hand and the first and second fingers of that hand are hooked over the grips 21. With the jaws 12 and 17 engaging the peripheral face of the closure 13, the container to which the closure is attached may be supported in the other hand. Thus a counterclockwise rotation of the tool when viewed according to Fig. 2 unscrews the closure from its container. The pressure engagement between the jaws 12 and 17 and the closure 13 is determined by the user during the rotary manipulation of the tool for closure removal purposes. A pull upon the grips 21, as when the grips 22 lie in the palm of the hand, tends to move the jaws 12 and 17 closer together and in more firm engagement with the closure 13. Thus the force of the closure engagement between the jaws and the closure is determined by the user. The clamping engagement between the jaws and the closure may be increased should the user note any slippage of the jaws on the closure.

In the present invention, the clamping engagement between the jaws and the closure need not be prefit, as through the medium of linkages and screw adjustments. In connection with such devices it frequently happens that the jaws are clamped too tightly on the closure, with the result that the container is cracked or otherwise damaged. In other cases, the presetting may be sufficient so that slippage will take place between the jaws and the closure. This necessitates further tightening of the jaws upon the closure.

In accordance with my invention, the necessary clamping relationship between the jaws and the closure is easily determined during the removal of the closure. A very slight pressure may be used in connection with containers which are relatively fragile. In other cases, the pressure may be increased as the condition warrants and under actual operating conditions, which eliminates excessive pressure as well as annoyances incident to insufficient pressure.

Both bars 10 and 15 are preferably formed of relatively thin and wide stock. The tool is rotated in the plane of the width of the stock so that the two bars possess the necessary strength to withstand the application of such forces as are necessary to unloosen the closure.

Infrequently it happens that a closure of unusually large diameter demands separation of the jaws 12 and 15 in such an amount as to bring the grips 21 beyond the reach of the fingers when the grips 22 lie in the palm of the hand. To facilitate manipulation of the tool under such conditions, an extension grip 23 is provided. This extension grip comprises a single piece of wire or bar bent back upon itself to provide parallel runs 24 which are bent at a slight angle at 25 and reversely in a greater degree at 26 to provide a U-shaped loop 27 which closely embraces the bars 10 and 15, as illustrated in Figs. 4 and 5, with the loop lying against the head 19. Reaches 24 terminate in grips 28, and the reaches 24 are of such length as to bring the grips 28 within proper reach of the fingers of the hand in which the grips 22 are placed, thus permitting application of the jaws 12 and 17 to closures of considerably more than the average diameters. The loop 27 slips easily in place and is removable with equal ease.

Without further elaboration, the foregoing will so fully illustrate my invention that others may, by applying current knowledge, readily adapt the same for use under various conditions of service.

I claim:

A closure remover tool comprising a first member having a jaw, a second member having a jaw opposing said first jaw, means connecting said first and second members for relative sliding movement, a first finger grip on said first member and a palm grip on said second member, and an extension finger grip having a U-shaped loop shaped to slip over said first and second members and to engage said first finger grip, said extension finger grip having finger elements, and connections between said finger elements and said loop positioning said finger elements between said first finger grip and said palm grip.

EMORY D. NICHOLS.